(12) United States Patent
Bertelloni et al.

(10) Patent No.: US 11,808,303 B2
(45) Date of Patent: Nov. 7, 2023

(54) CASING REINFORCED WITH RIBS FOR FOOD APPLICATIONS

(71) Applicant: AKTIEBOLAGET SKF, Gothenburg (SE)

(72) Inventors: Ettore Bertelloni, Massa (IT); Andrea A Bertolini, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/672,289

(22) Filed: Feb. 15, 2022

(65) Prior Publication Data

US 2022/0268317 A1 Aug. 25, 2022

(30) Foreign Application Priority Data

Feb. 19, 2021 (IT) .......................... 102021000003815

(51) Int. Cl.
*F16C 35/02* (2006.01)
*F16C 35/04* (2006.01)

(52) U.S. Cl.
CPC ............ *F16C 35/02* (2013.01); *F16C 35/047* (2013.01)

(58) Field of Classification Search
CPC ....... F16C 35/02; F16C 35/042; F16C 35/047
See application file for complete search history.

(56) References Cited

U.S. PATENT DOCUMENTS

| | | | |
|---|---|---|---|
| 3,989,323 A * | 11/1976 | Lambert | F16C 33/62 384/535 |
| 5,433,530 A | 7/1995 | Waskiewicz | |
| 9,145,920 B2 * | 9/2015 | Phillips | F16C 35/047 |
| 10,294,988 B2 * | 5/2019 | Rangan | F16C 33/6614 |
| 2003/0095732 A1 | 5/2003 | Ward | |
| 2012/0097824 A1 | 4/2012 | Geraud et al. | |
| 2019/0024705 A1 * | 1/2019 | Moyer | F16C 17/02 |

FOREIGN PATENT DOCUMENTS

CN  204025396  12/2014

OTHER PUBLICATIONS

Search Report for corresponding Italian Patent Application No. 102021000003815 dated Oct. 14, 2021.
Search Report for corresponding Great Britain Patent Application No. GB22003875 dated Apr. 13, 2022.

* cited by examiner

*Primary Examiner* — James Pilkington
(74) *Attorney, Agent, or Firm* — Reed Smith LLP

(57) ABSTRACT

A casing of a bearing unit for food applications may include a base having at least one hole for housing at least one fixing bolts, a spherical seat for housing the bearing unit, and at least one reinforcement rib located between the hole and the spherical seat.

2 Claims, 2 Drawing Sheets ced with ribs for food applications

CROSS-REFERENCE TO RELATED APPLICATIONS

This application is based on and claims priority to Italian Patent Application No. 102021000003815 filed on Feb. 19, 2021, under 35 U.S.C. § 119, the disclosure of which is incorporated by reference herein.

FIELD

The present disclosure relates to a reinforced casing for a bearing unit.

BACKGROUND

A casing for a rotary shaft of a bearing unit secured to a machine framework is known and commonly used. The casing, in general, has a spherical seat which houses internally the bearing unit (referred to as Y-bearing units or insert bearings), which in turn allows rotation of a rotary shaft of a machine with respect to the casing which is itself a static component, secured to the framework of the machine.

BRIEF DESCRIPTION OF THE DRAWINGS

The attached drawings illustrate various non-limiting exemplary embodiments in accordance with this disclosure, in which.

DETAILED DESCRIPTION

In the food and beverages industry, there is increasing focus on the development of new machines and machine designs aimed at improving the safety and quality of foodstuffs.

A typical component for such applications is a casing, generally, but not exclusively, made of composite polymeric material, compatible with food applications.

A design strength of a casing is equal to the allowable load on a bearing unit. Commercial bearing unit catalogues usually state a load value Co expressed in Newtons which represents a design strength of the bearing unit.

However, it has been learned that it often happens that an end user in food applications does not adhere to the load values stated. Moreover there can be spurious loads, of unpredictable magnitude, during transportation which place strain on the casing and often cause it to break.

Under working conditions, whether in use at an end customer or during testing by an applicant, mechanical failure of the casing has been observed even with a load below the static design load Co. Critical points have been observed on a base of a casing, between a hole for a bolt and a seat of a bearing unit. In particular, it turns out that a critical area is a point of connection between the base and the seat of the bearing unit. In this area, the tensions that are present propagate through and damaged the whole seat of a bearing unit to which it is applied. It is therefore necessary to define a casing that can overcome or at least mitigate the abovementioned drawbacks.

To substantially solve the technical problems set forth above, one aim of the present disclosure is to define a reinforced casing for food applications, and in particular a casing for a rotary shaft and associated bearing unit secured to a machine framework.

To this end, in accordance with one aspect of the present disclosure, a casing made of composite polymeric material, comprises at least one rib, or a plurality of ribs for reinforcement.

According to exemplary embodiments in accordance with this disclosure, there may be two pairs of ribs distributed between a respective hole of a pair of holes for fixing bolts and a spherical seat of a bearing unit. Each pair of ribs may be placed on an opposite side with respect to a spherical seat of the bearing unit.

Better performance is obtained with an increase in the allowable radial breaking and shear load and avoiding the creation of localized weak areas and points of high stress from which cracks can propagate and lead to breakage of the casing.

By implementing ribs in area exposed to high stresses, tension is made more uniform and is reduced in absolute terms. Therefore, stressing of material is kept below any yield and breakage points. This gives a casing excellent strength, both in a plane passing through axes of the bolts and in a direction orthogonal to said plane.

Exemplary embodiments are described herein with reference to a reinforced food casing 10.

Figure 1:
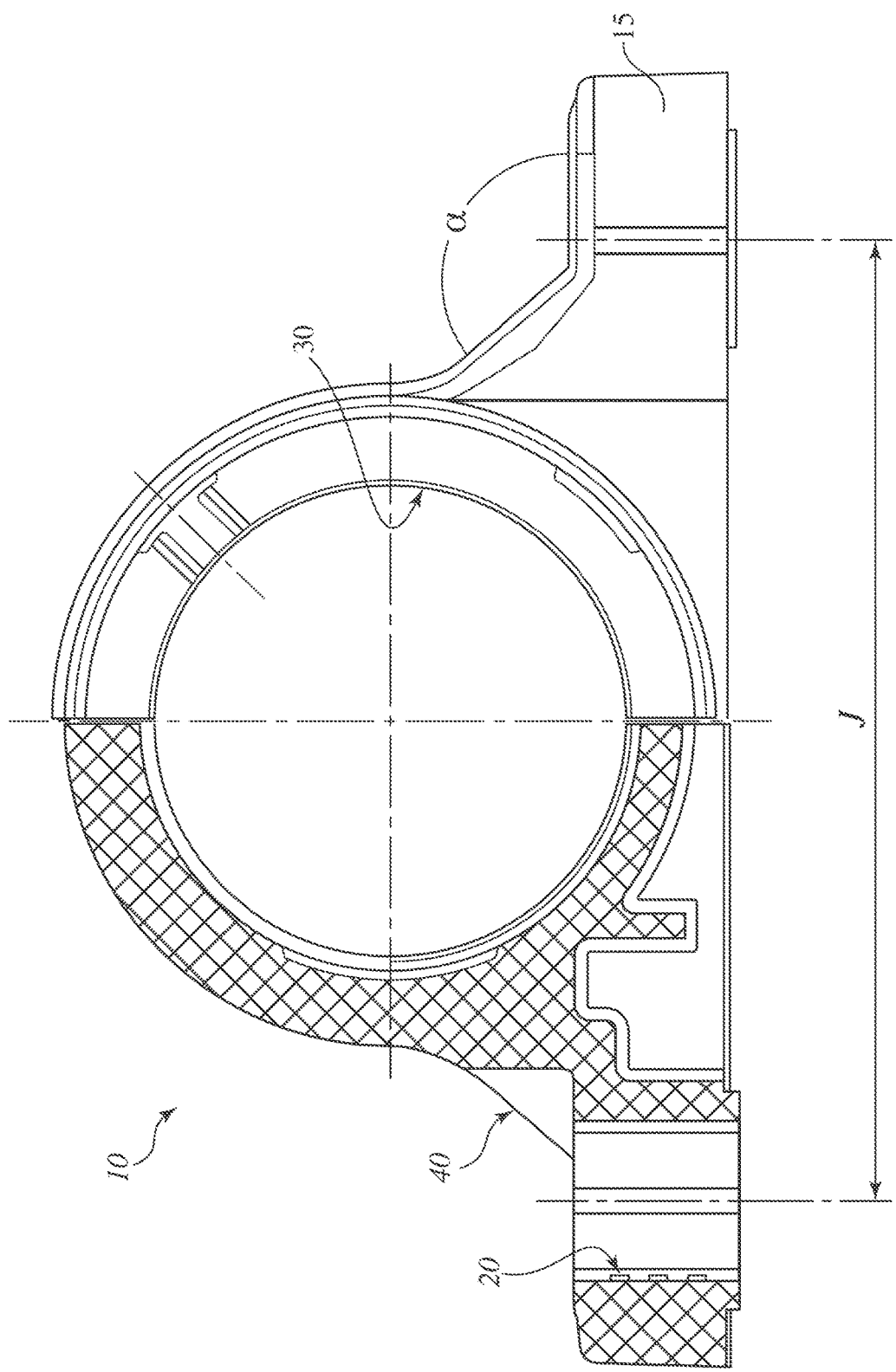
FIG. 1 is a cross-sectional view of various embodiments of a reinforced casing for food applications in accordance with this disclosure.
Figure 3:
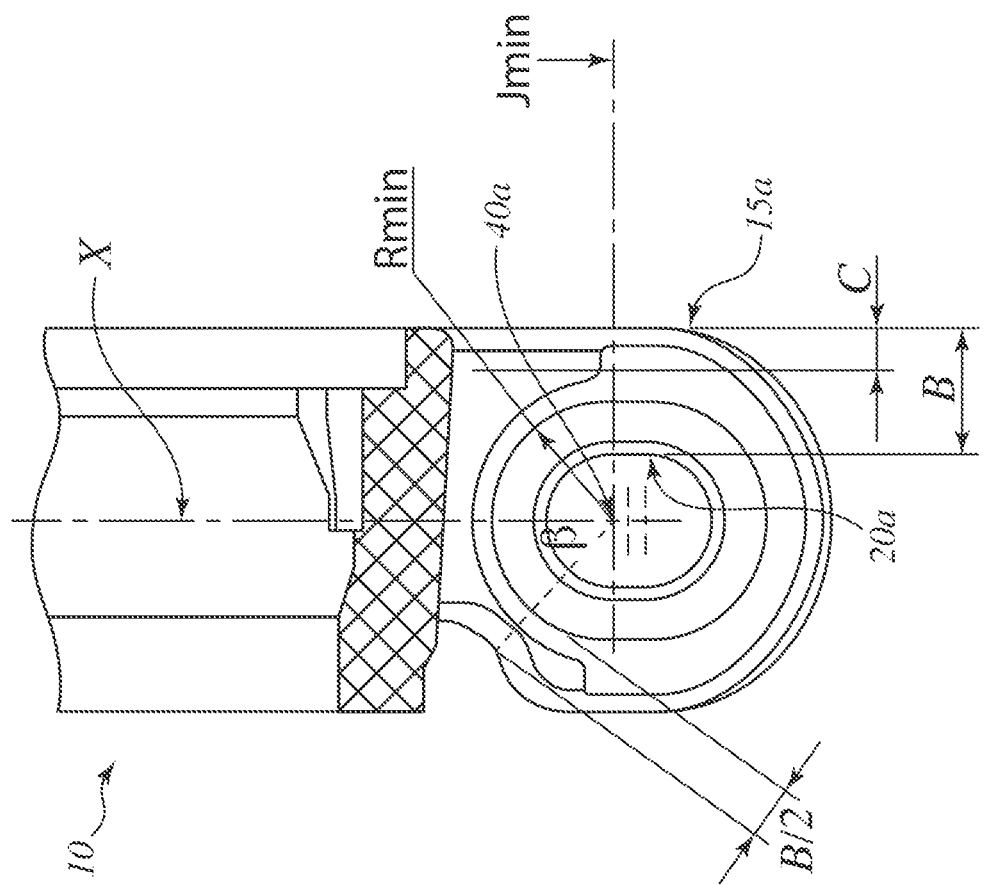
FIG. 3 is a detail view in plan view of the casing of FIG. 1 on a plane orthogonal to a base of the casing showing further characteristic dimensions defining the pair of reinforcing ribs, according to various exemplary embodiments in accordance with this disclosure.
Figure 2:
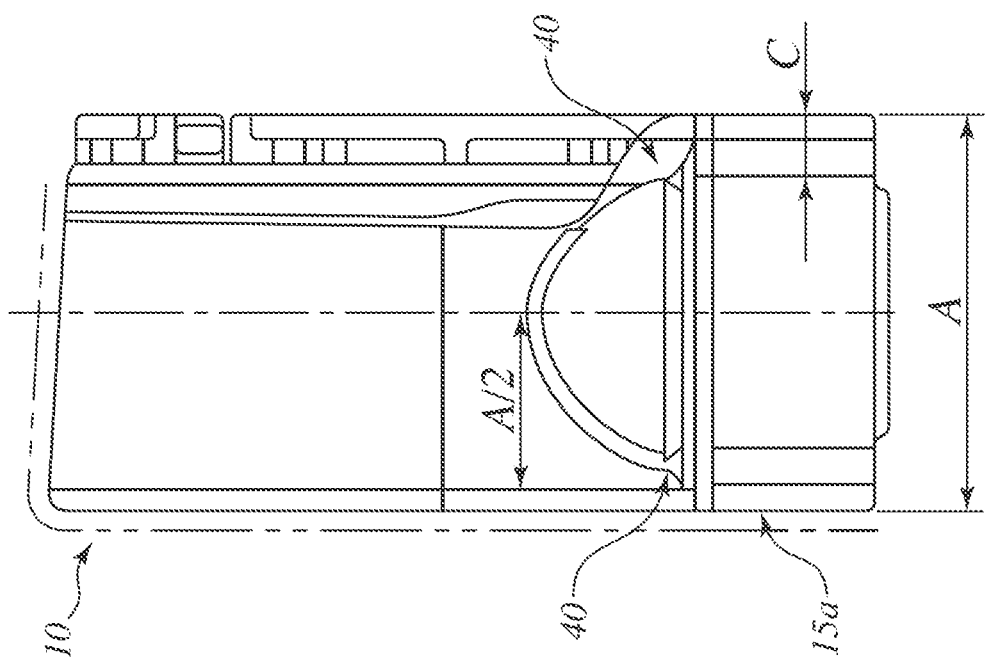
FIG. 2 is a detail view of various embodiments of a casing according to FIG. 1, which has a pair of reinforcing ribs with some characteristic dimensions thereof, according to various exemplary embodiments in accordance with this disclosure.

With reference to FIG. 1, a reinforced casing 10 for food applications may be made of a composite polymeric material. A casing 10 may include a base 15, at least one hole 20 located in base 15 for at least one housing fixing bolt (not shown) for fixing to a framework of a machine, and a spherical seat 30 for housing a bearing unit (not depicted). In various embodiments, a casing 10 may include a pair of holes 20 such that a first hole of the pair of holes 20 may be spaced from a second hole of the pair of holes 20 by a length J. Length J may be measured from a center axis of the first hole to a center axis of the second hole.

A casing 10 has at least one rib 40 for reinforcement. In some embodiments, casing 10 may have two pairs of ribs 40 each pair located between a hole of a pair of holes 20 and a spherical seat 30 of a bearing unit, each pair of ribs 40 placed on an end of the seat 30 opposite another end of the seat 30. In other embodiments, there may be more than two holes 20. In such embodiments, the number of pairs of ribs 40 may be greater than 2

In the present disclosure, the reference sign 20 may be used for a single hole of a pair of holes and for the pair of holes. Reference sign 40 may be used for a single rib of a pair of ribs and for the pair of ribs.

In various embodiments, a pair of ribs 40 may have a rounded shape around an edge of a pair of holes 20 for receiving at least one fixing bolt. Pair of ribs 40 makes a casing 10 stronger, ensuring better performance in terms of breakage when subjected to stress, whether shear or tensile stress. In particular, pair of ribs 40 distribute a highest tension over a greater surface area, while at the same time reducing highest absolute values thereof. Structural analyses performed have shown that tensile peaks are reduced and load lines are no longer localized but are distributed over a base 15 of a casing 10.

It was possible to compare a distribution of loads on a casing according to known devices, e.g., hence without at least one reinforcing rib, and a casing having at least one rib according to the present disclosure. In an embodiment according to known bearing units, in which a casing does not have at least one rib, a load acts on a portion of the casing where a spherical seat of a bearing unit is made, i.e., at a certain height from a base of the casing, creating a shear stress and moment on the base. This means that there is a zone under high load in an entire area of the base between at least one hole for at least one fixing bolts and a seat of the bearing unit, rapid breakage of the casing may result. In embodiments according to known bearing units, a stress peak is substantially equal to a breaking load.

In an exemplary embodiment in accordance with this disclosure, in which a casing 10 has at least one pair of ribs 40, load lines and tensions shift from ribs 40 to a base 15, in an area near at least one hole for at least one bolt. This means that there may be fewer stresses distributed and a smaller load area, harmonizing stresses and reducing stress peaks. A maximum stress value may be reduced and lies well below a yield load.

By reducing the maximum stress values, a casing in accordance with this disclosure may withstand high loads.

Improved results discussed herein may be linked to precise design specifications that take into account a desired structural strengthening and technological and assembly constraints of a casing, e.g. 10, and hence its characteristic dimensions. In various exemplary embodiments, the design specification of a casing 10 may include a spacing J, measured from a center of a first hole of a pair of holes 20 to a center of a second hole of the pair of holes 20, and a width A of a base 15. On the basis of these dimensions, it is possible to define dimensions that make it possible to produce a pair of ribs 40 in accordance with this disclosure.

In various embodiments, a width A of a base 15 may assist in identifying a position of one or more pairs of ribs 40 such that the curvature of the one or more pairs of ribs 40 is as symmetrical as possible with respect to an axis of symmetry of a hole of a pair of holes 20. In some embodiments, an axis of symmetry X of the one or more pairs of ribs 40 may coincide with the axis of symmetry of the hole of the pair of holes 20 and is aligned with a mid-plane of a spherical seat 30 in which a bearing unit is mounted. In some embodiments, the distance between the axis of symmetry X and a wall 15a of the base 15 may be equal to A/2.

One or more pairs of ribs 40 may define a minimum spacing $J_{min}$ between a one or more centers of symmetry 40a of each pair of ribs 40. In various embodiments, spacing $J_{min}$ may be:

$J_{min} > J-2$ mm

Moreover, using a polar coordinate system, characteristic dimensions of one or more pairs of ribs 40 may include a minimum radius $R_{min}$, defined from a center of symmetry 40a of each pair of ribs 40, and two angles, α and β in a plane orthogonal to a base 15 and in a plane parallel to the base 15, respectively. In various embodiments, minimum radius $R_{min}$ may be as small as possible to define a maximum strong section of each rib of the one or more pairs of ribs 40, while allowing insertion of a key for tightening one or more bolts and not reducing a surface area for bearing of a head of the one or more bolts. With Φ as a diameter of the bolts, the following may therefore hold:

$R_{min} > \Phi + 0.8$ mm

An angle α may define an average angle of inclination of one or more pairs of ribs 40 with respect to a base 15. In various embodiments, α may range between 120° and 140°.

An angle β may define, in a plane parallel to a base 15, an average inclination of one or more pairs of ribs 40 with respect to an axis of symmetry X of the one or more pairs of ribs 40. In various embodiments, β may range between 40° and 50°.

A dimension B may be defined as a distance between a wall 20a of one or more holes 20 and a wall 15a of a base 15.

A dimension C may be defined as a width of a lower base section of one or more ribs of one or more pairs of ribs 40 available on base 15 of a casing 10 to ensure a curvature of the one or more pairs of ribs 40 that does not hamper tightening of one or more bolts. In various embodiments, a width C of a lower base of a rib of the one or more pair of ribs 40 may be:

$C > B/2 - 0.8$ mm

In various embodiments, a radius of a curvature of one or more pairs of ribs 40 may be between 0.8 mm and 2 mm.

The solution consisting of a reinforced casing with a plurality of ribs may be applied to all existing types of casings for food applications. By way of non-limiting example, a casing may include a square flange casing, an oval flange casing, a flanged casing with three bolts, a casing with upright, support, or a casing with upright support and a short base.

In addition to the exemplary embodiments described herein, it must be understood that there exist numerous other embodiments. It must also be understood that these embodiments are only examples and do not limit either the scope of this disclosure, nor its applications, nor its possible configurations. On the contrary, although the description above allows a person skilled in the art to implement the present disclosure at least according to one of its exemplary embodiments, it must be understood that many variants of the components described are possible, without thereby departing from the scope of the disclosure, as defined in the accompanying claims, interpreted literally and/or in accordance with their legal equivalents.

The invention claimed is:

1. A casing of a bearing unit comprising:
    a base, the base comprising at least one hole for receiving at least one fixing bolt,
    a spherical seat for housing the bearing unit, and
    at least one reinforcing rib located between the hole and the spherical seat,
    wherein the casing has a pair of holes and the at least one reinforcing rib comprises two pairs of ribs, each pair of ribs located between a respective hole of the pair of holes and the spherical seat,
    wherein a distance between an axis of symmetry (X) of each of the pair of ribs and a wall of the base is equal to half a width (A) of the base,
    wherein a minimum spacing (Jmin) between a center of symmetry of each pair of ribs is:

Jmin > J−2 mm wherein J is a distance between an axis of symmetry of a first hole of the pair of holes,
    wherein a minimum radius ($R_{min}$) measured from a center of symmetry of each of the pair of ribs is defined as:

$R_{min} > \Phi + 0.8$ mm wherein Φ is a diameter of at least one fixing bolt, wherein an angle (α), measured on a plane orthogonal to the base, defines an average angle of inclination of the at least one reinforcing rib with respect to the base and ranges between 120° and 140°, wherein an angle (β), measured on a plane parallel to the base, defines an average angle of inclination of each of the pair of ribs with respect to the axis of symmetry (X) and ranges between 40° and 50°, wherein a width (C) of a lower base portion of a rib of the pair of ribs is:

$$C > B/2 - 0.8 \text{ mm}$$

wherein B is a distance between a wall of the holes and the wall of the base, and wherein the at least one rib comprises rounded surfaces with a radius of curvature between 0.8 mm and 2 mm.

2. The casing of claim 1, wherein the casing comprises a composite, polymeric material.

\* \* \* \* \*